United States Patent
Sekiguchi et al.

(10) Patent No.: US 6,799,852 B2
(45) Date of Patent: Oct. 5, 2004

(54) IMAGE DISPLAY PROJECTOR

(75) Inventors: Akira Sekiguchi, Tokyo (JP); Hidehiko Hori, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/673,396

(22) Filed: Sep. 30, 2003

(65) Prior Publication Data

US 2004/0070738 A1 Apr. 15, 2004

(30) Foreign Application Priority Data

Oct. 7, 2002 (JP) ........................................ 2002-293314

(51) Int. Cl.$^7$ ........................ G03B 21/20; G03B 21/26; G03B 21/28
(52) U.S. Cl. ............................. 353/102; 353/37; 353/98
(58) Field of Search ............................. 353/30, 31, 34, 353/37, 81, 84, 98, 99, 102; 349/5, 6, 7, 8; 348/771, 744, 782

(56) References Cited

U.S. PATENT DOCUMENTS 6,583,940 B2 * 6/2003 Nishikawa et al. ......... 359/738
6,609,798 B1 * 8/2003 Milinusic et al. ............. 353/98
6,634,755 B1 * 10/2003 Okuyama et al. ............. 353/31
2002/0054276 A1 * 5/2002 Kurematsu ..................... 353/31

FOREIGN PATENT DOCUMENTS

| JP | 2000-098272 A | 4/2000 | .......... G02B/26/08 |
| JP | 2001-183603 A | 7/2001 | .......... G02B/27/18 |

* cited by examiner

Primary Examiner—Alan A. Matthew
Assistant Examiner—Melissa J Koval
(74) Attorney, Agent, or Firm—Birch, Stewart, Kolasch & Birch, LLP

(57) ABSTRACT

An image display projector includes a lens element for focusing a light beam from a lamp light source, a reflecting mirror for reflecting a light beam emitted from the lens element, an elliptical mirror for reflecting a light beam emitted from the reflecting mirror, a light valve for modulating a light beam reflected by the elliptical mirror, thereby forming an image light, and a projection lens for projecting the image light onto a screen. In this image display projector, a light focusing point, where the light beam emitted from the lens element is focused, is symmetric to one of the two focal points of the elliptical mirror with respect to the reflecting mirror, and the center of an entry pupil of the projection lens is symmetric to the second focal point of the elliptical mirror with respect to the light valve.

5 Claims, 6 Drawing Sheets

IMAGE DISPLAY PROJECTOR

This nonprovisional application claims priority under 35 U.S.C. § 119(a) on Patent Application No. 2002-293314 filed in Japan on Oct. 7, 2002, which is herein incorporated by reference.

BACKGROUND OF THE INVENTION

1. Field of the Invention

The present invention relates to an image display projector for displaying an image formed by a reflective light valve such as a DMD onto a screen.

2. Description of the Related Art

In recent years, the DMD (Digital Micromirror Device: a trademark of Texas Instruments Incorporated) has attracted attention as a light valve used in the image display projector. The DMD electrically controls a plurality of 16×16 micron mirrors (hereinafter referred to as micromirrors) disposed on a silicon substrate, thereby controlling the reflection direction of light rays incident on micromirrors, each of which corresponds to a pixel. By tilting each micromirror +10 or −10 degrees, the incident light is separated into ON beams, which enters into a projection lens, and OFF beams blocked by a light absorber. The ON beams reflected by the micromirrors are projected through the projection lens and form an image onto a screen.

In conventional image display projectors using the DMD, a light generated by a light source is directed to the DMD surface using reflecting mirrors. These reflecting mirrors reflect the light to predetermined directions so as to introduce the light from the light source to the DMD surface. In such a structure, a prescribed spacing is required between the axis of the light emitted from the light source and the axis of the ON beams separated by the DMD, and so it is difficult to realize miniaturization of the projector.

As a solution to this problem, optical systems to miniaturize projecting device are disclosed in Japanese Patent Laid-Open No. 2000-98272 and Japanese Patent Laid-Open No. 2001-183603. In the disclosed projecting devices, a light from the light source is reflected by a first reflecting mirror, and the light reflected by this first mirror is reflected toward the DMD surface by a second reflecting mirror. Each optical element in the disclosed projecting devices is arranged so that the axis of the light emitted from the light source that enters into the first reflecting mirror becomes perpendicular to the axis of the ON beams separated by the DMD that enters into the projection lens. By introducing the light from the light source to the DMD in this manner, the axis of the light emitted from the light source and the axis of the ON beams can be placed close to each other, thereby reducing a size of the device.

Although the projecting devices cited above realize miniaturization, they use a spherical or concave mirror for the second reflecting mirror, which is liable to cause aberration. Thus, angles of the light rays incident on each micromirror of the DMD become not uniform due to the aberration caused by the second reflecting mirror. Consequently, the ON beams and the OFF beams are not fully separated, and the contrast of the projected image decreases. Furthermore, because the directions of the ON beams reflected by the micromirrors also become not uniform, the quantity of the ON beams entering into a pupil of the projection lens decreases. Thus, the brightness of the image displayed on the screen deteriorates in the periphery.

This problem becomes more pronounced when the relative aperture of the second reflecting mirror is decreased to miniaturize the device.

SUMMARY OF THE INVENTION

The present invention is directed at solving these problems, and an object of the invention is to miniaturize the projector without causing contrast deterioration or uneven light intensity.

In one aspect of this invention, an image display projector includes a lens element for focusing a light beam from a lamp light source, a reflecting mirror for reflecting a light beam emitted from the lens element, an elliptical mirror for reflecting a light beam emitted from the reflecting mirror, a light valve for modulating a light beam reflected by the elliptical mirror, thereby forming an image light, and a projection lens for projecting the image light onto a screen. In this image display projector, a light focusing point, where the light beam emitted from the lens element is focused, is symmetric to one of the two focal points of the elliptical mirror with respect to the reflecting mirror, and the center of an entry pupil of the projection lens is symmetric to the second focal point of the elliptical mirror with respect to the light valve.

In another aspect of this invention, an image display projector includes a first lens element for focusing light from a lamp light source, a prismatic optical element, a second lens element for focusing a light from the prismatic optical element, a reflecting mirror for reflecting the light from the second lens element, an elliptical mirror for reflecting the light from the reflecting mirror, a light valve for modulating a light beam emitted from the elliptical mirror, thereby forming image light, and a projection lens for projecting the image light onto a screen. In the image display projector, a light focusing point, where the light beam emitted from the second lens element is focused, is symmetric to one of the two focal points of the elliptical mirror with respect to the reflecting mirror, and the center of an entry pupil of the projection lens is symmetric to the second focal point of the elliptical mirror with respect to the light valve.

DETAILED DESCRIPTION OF THE PREFERRED EMBODIMENT

Figure 1:
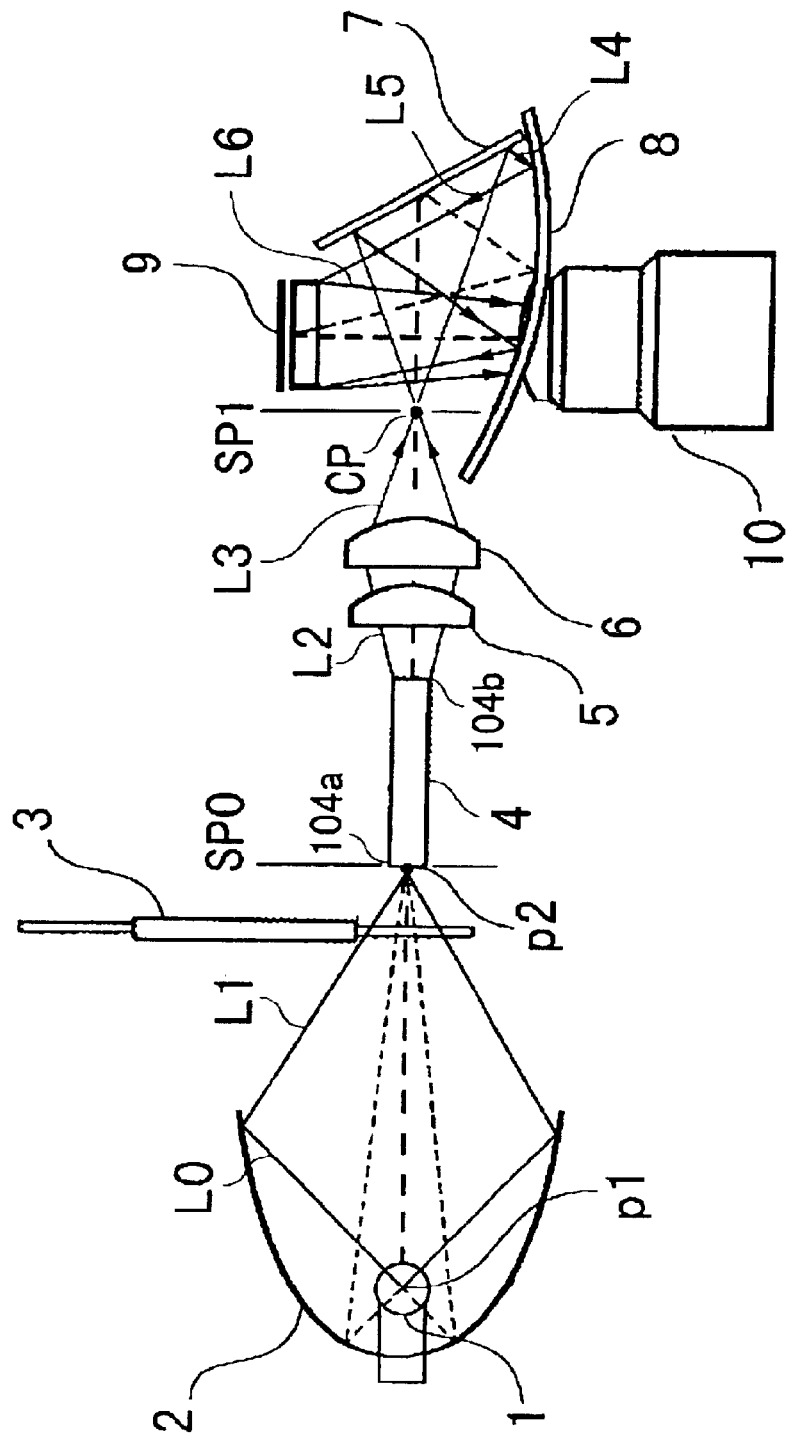
FIGS. 1, 2 and 6 are diagrams each illustrating an image display projector of the present invention.
Figure 2:
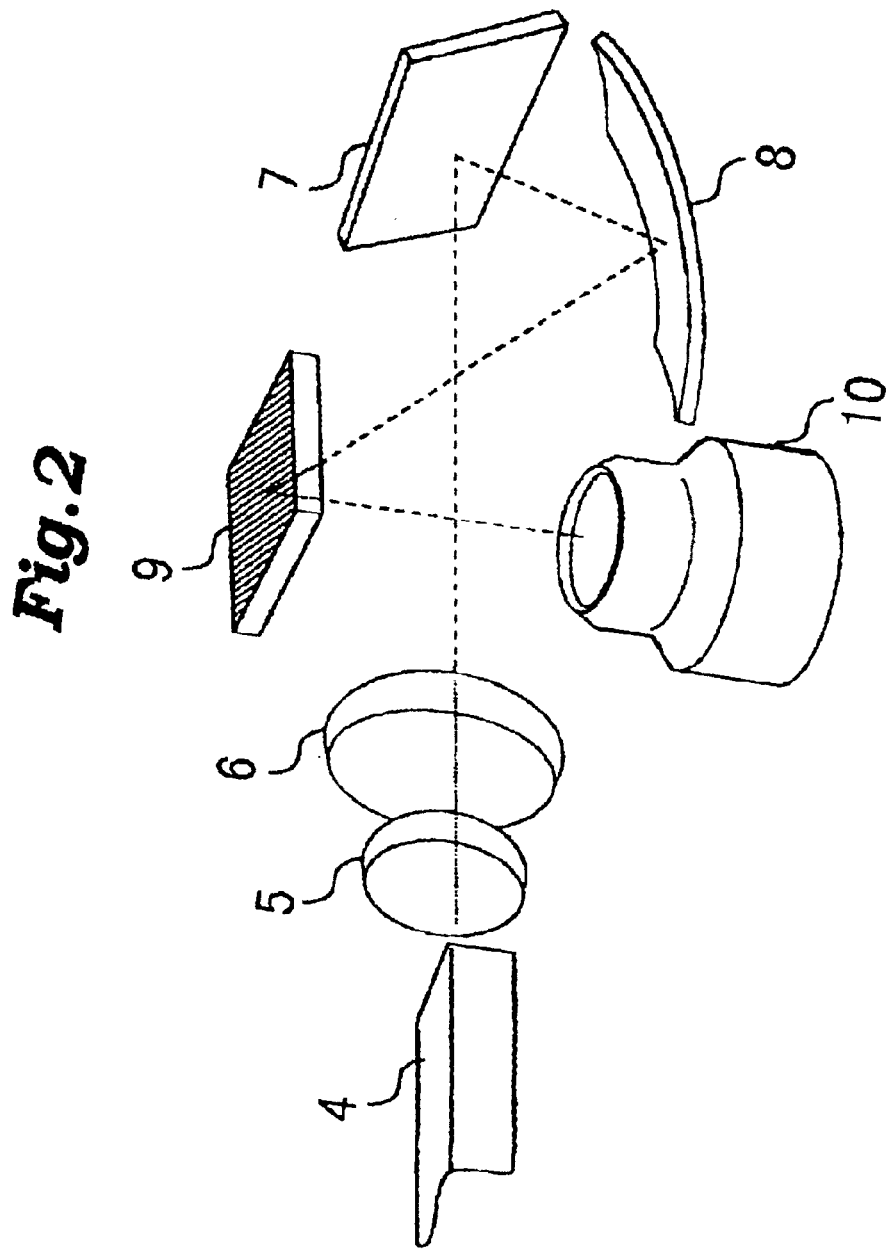

The present invention will now be explained with reference to the drawings which show an embodiment thereof. FIG. 1 is a diagram showing a side view of an image display projector of this invention. As illustrated in FIG. 1, the image display projector of the invention comprises a lamp light source 1, a lamps reflector 2, a color wheel 3, a light pipe 4, relay lenses 5 and 6, a reflecting mirror 7, an elliptical mirror 8, a reflective light valve 9, and a projection lens 10. FIG. 2 is a diagram illustrating the positional relationship of the relay lenses 5, 6, the reflecting mirror 7, the elliptical mirror 8, and the reflective light valve 9.

A high pressure mercury lamp or a halogen lamp may be used as the lamp light source 1. The lamp light source 1 is located at one focal point p1 of the lamp reflector 2, which has an elliptical face. The lamp reflector 2 focuses a light beam L0 emitted from the lamp light source 1 on the other focal point p2. An entry face 104a of the light pipe 4 is located at the focal point p2.

Figure 3:
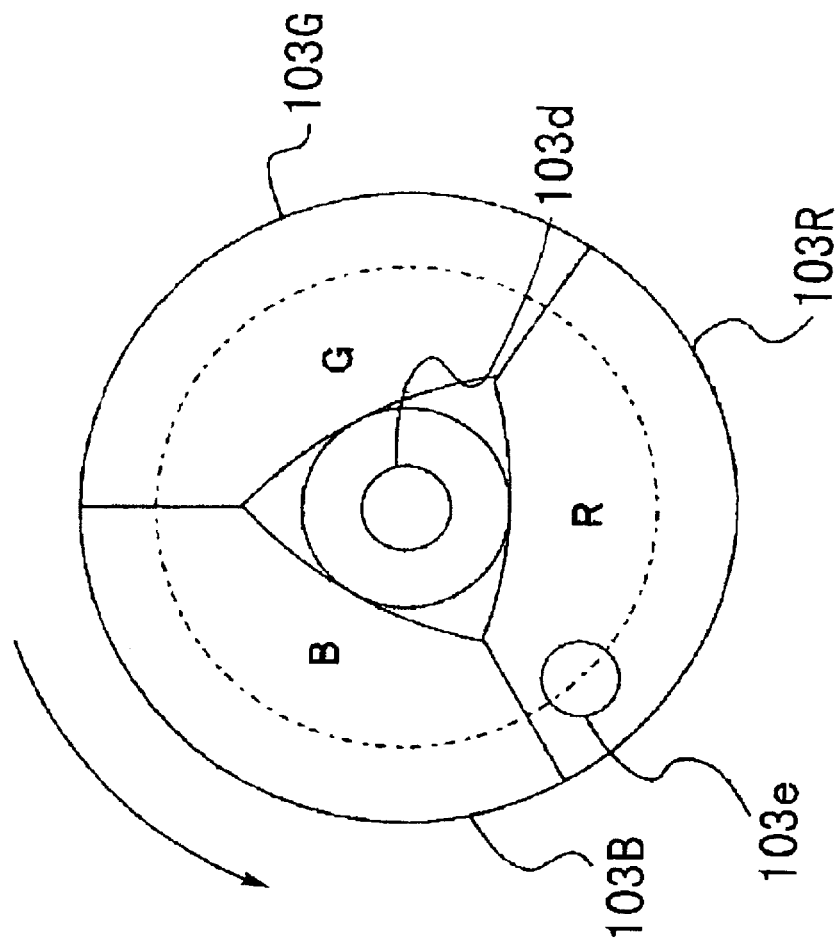
FIG. 3 is a diagram illustrating a front view of a color wheel.

FIG. 3 is a diagram showing a front view of the color wheel 3. As shown in FIG. 3, the color wheel 3 comprises color filters 103R, 103G, and 103B, which convert and transmit incident light into red (R), green (G), and blue (B) light, respectively, and a motor 103d which rotates these color filters 103R, 103G, and 103B, in the direction of the arrow. In FIG. 3, broken line 103e indicates a locus of a light beam L1, which is transmitted through each color filter 103R, 103G, and 103B. By sequential transmission through the color filters 103R, 103G, and 103B, rotated by the motor 103d, the light beam L1 is converted into red, green and blue light, enters into the entry face 104a of the light pipe 4. Each optical element after the color wheel 3 receives red, green, and blue light sequentially.

Figure 4:
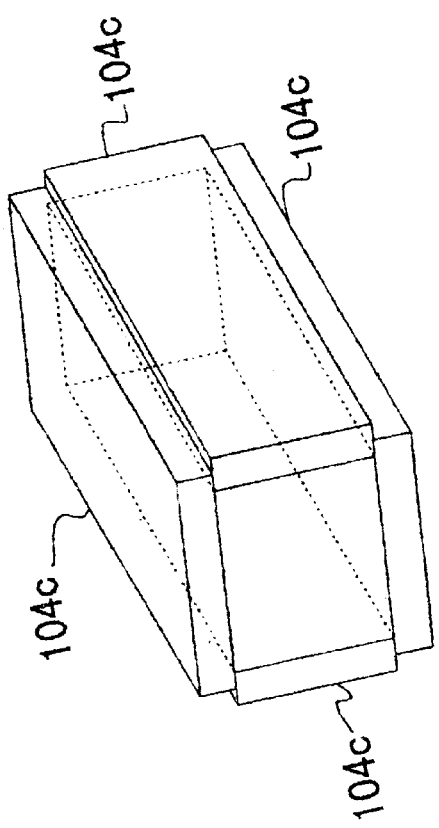
FIGS. 4 and 5 are diagrams each illustrating a light pipe.

FIG. 4 is a diagram illustrating a detailed configuration of the light pipe 4. As shown in FIG. 4, the light pipe 4 is formed in a pipe form with four plane mirrors 104c having their reflective surfaces facing inward.

Figure 5:
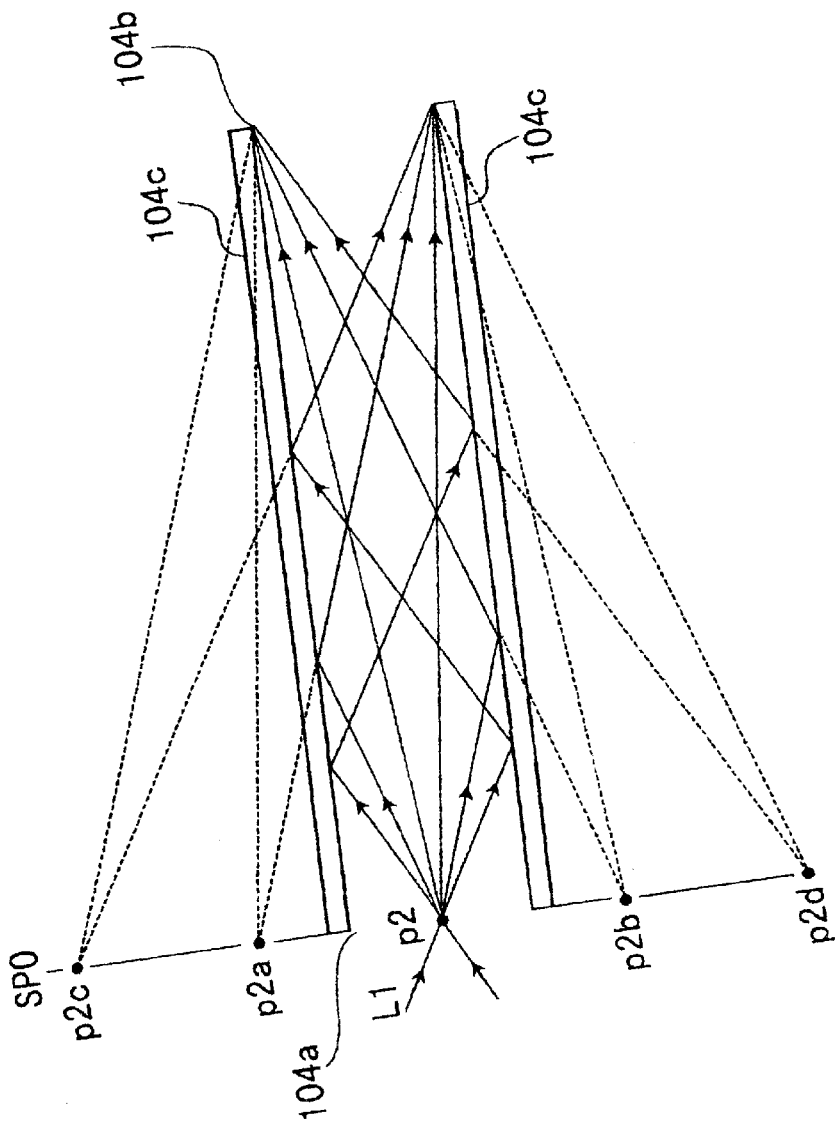

FIG. 5 is a diagram illustrating a function of the light pipe 4 internally reflecting light rays. As shown in FIG. 5, the light beam L1 converges at the focal point p2 formed on the entry face 104a of the light pipe 4 and then enters inside the light pipe 4. Light rays entering inside the light pipe 4 are either reflected a predetermined number of times on inner faces of the light pipe 4 or pass through without reflection to the inner faces. The light rays reflected on the inner faces of the light pipe 4 are superimposed on the emission face 104b as though they were light rays emitted from virtual light source points p2a, p2b, p2c, p2d formed on a plane SP0 which includes the entry face 104a. By superimposing a plurality of light rays reflected on the inner faces of the light pipe 4, as shown in FIG. 5, a rectangular light source image of high uniformity is formed at the emission face 104b.

A light beam L2, emitted from the light pipe 4, enters in the relay lenses 5 and 6. A light beam L3, emitted from the relay lenses 5 and 6, is focused on a focal point CP and then spreads in the direction of the reflecting mirror 7. At the same time, images of the light source points is formed on a plane SP1, where the focal point CP is formed. These images of the light source points correspond to the virtual light source points p2a, p2b, p2c, p2d formed on the plane SP0, where the entry face 104a of the light pipe 104 is located. This means that the planes SP0 and SP1, as well as the focal point p2 and the focal point CP have conjugate relationships.

The relay lenses 5 and 6 are arranged so that the reflective light valve 9 has a conjugate relationship with the emission face 104b of the light pipe 4 on which the rectangular light source image is formed. The emission face 104b is shaped analogous to a surface of the reflective light valve 9 so that an illumination of uniform light intensity can be obtained at the light valve 9.

The reflecting mirror 7 reflects the light beam L3, which spreads from the focal point CP, towards the elliptical mirror 8 which has a reflecting face with an elliptical shape. The elliptical mirror 8 reflects a light beam L4, towards the reflective light valve 9. A light beam L5 reflected by the elliptical mirror 8 illuminates the reflective light valve 9. The reflective light valve 9 modulates the light beam L5. A modulated light beam L6, which forms an image, is reflected to the projection lens 10. The light beam L6 enters into the entry pupil of the projection lens 10.

The DMD or a reflective liquid crystal panel may be used for the reflective light valve 9. The reflective light valve 9 receives R, G, and B sequentially. The cycle at which the R, G, and B light successively changes is sufficiently fast that these three colors of light is integrated into a full color image in the observer's eye. The image formed by the reflective light valve 9 is projected on a screen, which is not shown here, by the projection lens 10.

Figure 6:
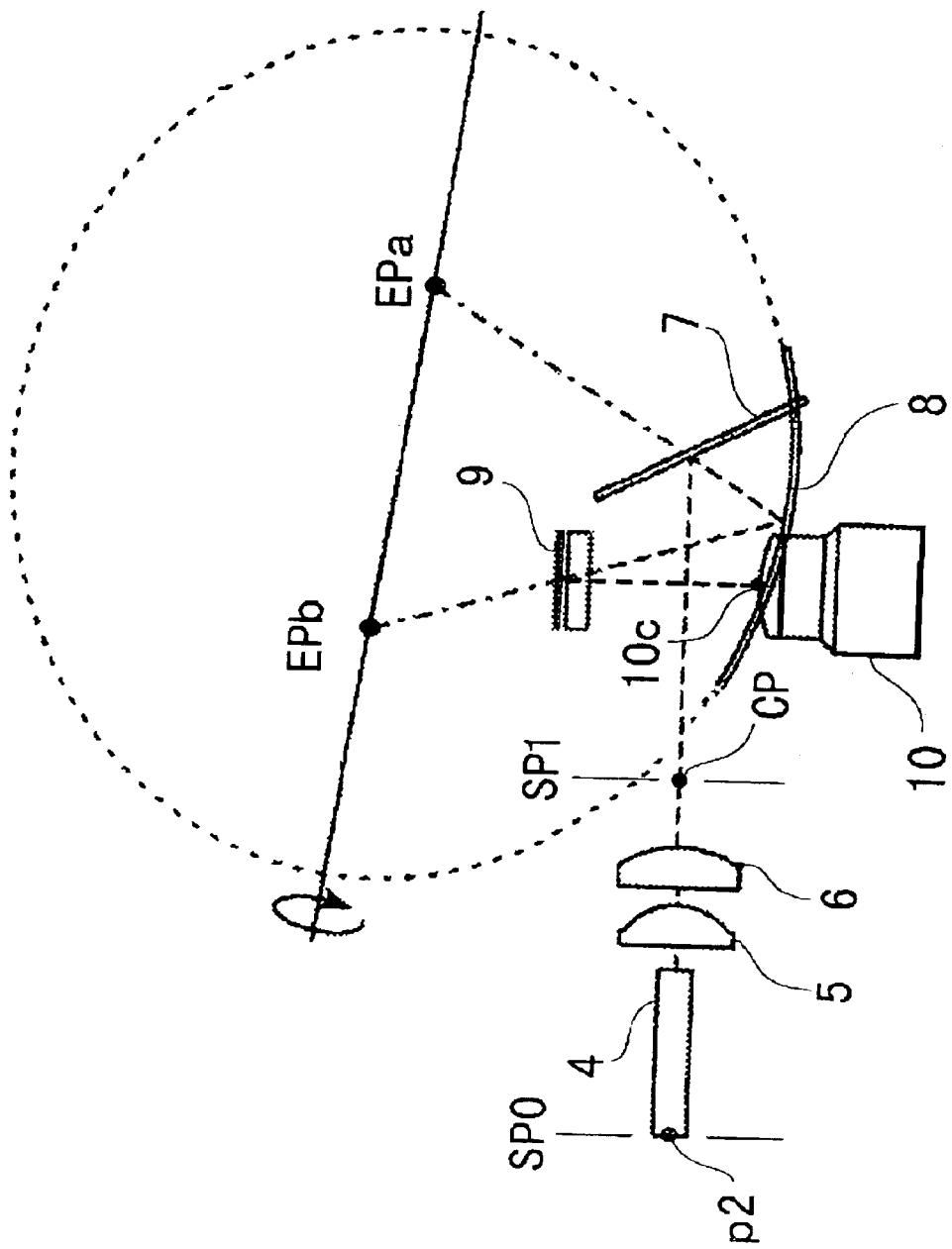

FIG. 6 is a diagram illustrating the image formation relationship of each of the optical elements included in the image display projector of the present invention. In FIG. 6, EPa and EPb respectively indicate the focal points of the elliptical mirror 8. A key feature of the image display projector of this invention is that each optical element are placed so that the focal point CP of the light beam L2 focused by the relay lenses 5 and 6, and the focal point EPa of the elliptical mirror 8 are symmetric with respect to the reflecting mirror 7, and the center point 10c of the entry pupil of the projection lens 10 and the other focal point EPb of the elliptical mirror 8 are symmetric with respect to the reflective light valve 9. In this configuration, the focal point CP forms a conjugate relationship with the focal point EPa, and a center point 10c of the entry pupil of the projection lens 10 forms a conjugate relationship with the focal point EPb. Furthermore, a geometrical property of the elliptical mirror 8, which has two focal points EPa and EPb, whereby the light emitted from the focal point EPa is all focused to the other focal point EPb, realizes a complete conjugate relationship between the focal point CP and the center point 10c. In this complete conjugate relation ship, angles of light rays incident on the reflective light valve 9 become uniform, and the light rays are fully separated into the ON light beams and the OFF light beams. Furthermore, since the light beam L6 modulated by the reflective light valve 9 is converged on the center point 10c of the entry pupil of the projection lens 10, it enters into the projection lens 10 without loss. Accordingly, a high contrast image with even brightness is obtained on the screen.

In the image display projector discussed above, the conjugate relationship of the emission face 104b of the light pipe 4 and the reflective light valve 9 can be formed independentely of the conjugate relationship of the focal point CP and the center point 10c of the entry pupil of the reflection lens 10.

As described above, the image display projector of this invention includes the elliptical mirror 8, and the optical elements in this image display projector are placed so that the focal point CP formed by the relay lenses 5 and 6 is symmetric to the focal point EPa of the elliptical mirror 8 with respect to the reflecting mirror 7, and the center point 10c of the entry pupil of the projection lens 10 is symmetric to another focal point EPb of the elliptical mirror 8 with respect to the light valve 9. This feature realizes small sized image projector of high brightness and high contrast.

What is claimed is:

1. An image display projector comprising:
    a lamp light source;
    a lens element for focusing a light beam emitted from the lamp light source;
    a reflecting mirror for reflecting a light beam emitted from the lens element;
    an elliptical mirror having a reflecting face with an elliptical shape for reflecting a light beam reflected by the reflecting mirror;
    a light valve for modulating a light beam reflected by the elliptical mirror to thereby form image light; and
    a projection lens for projecting the image light onto a screen; wherein
    a light focusing point, where the light beam emitted from the lens element is focused is symmetric to one of the two focal points of the elliptical mirror with respect to the reflecting mirror, and
    the center of an entry pupil of the projection lens is symmetric to the second focal point of the elliptical mirror with respect to the light valve.

2. An image display projector comprising:

a lamp light source;

a first lens element for focusing a light beam emitted from the lamp light source;

a prismatic optical element having
- an entry face, on which the first lens element focus the light beam emitted from the lamp light source,
- inner faces for reflecting a light beam entering from the entry face, and
- an emission face for emitting the light entering from the entry face;

a second lens element for focusing a light beam emitted from the emission face of the prismatic optical element;

a reflecting mirror for reflecting a light beam emitted from the second lens element;

an elliptical mirror having a reflecting face with an elliptical shape for reflecting a light beam reflected by the reflecting mirror;

a light valve for modulating the light reflected by the elliptical mirror to thereby form image light; and a projection lens for projecting the image light onto a screen; wherein a light focusing point, where the light beam emitted from the second lens element is focused is symmetric to one of the two focal points of the elliptical mirror with respect to the reflecting mirror; and the center of an entry pupil of the projection lens is symmetric to the second focal point of the elliptical mirror with respect to the light valve.

3. The image display projector according to claim 2, wherein the second lens element is arranged so that the emission face of the prismatic optical element and the light valve are in a conjugate relationship.

4. The image display projector according to claim 2, wherein the entry face of the prismatic optical element is arranged close to a light focusing point where the light that passes through the first lens element is focused.

5. The image display projector according to claim 2, wherein the emission face of the prismatic optical element is shaped analogously to the light valve.

* * * * *